Figure 1:
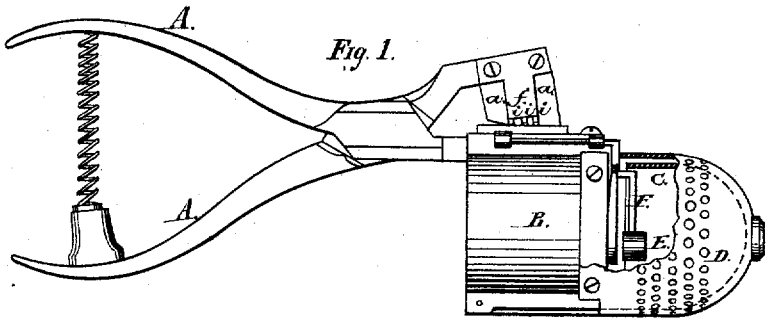

I. HYDE.

ALARM AND FARE-REGISTERING MECHANISM.

No. 6,916. Reissued Feb. 8, 1876.

WITNESSES.

Edw. W. Bound

John J. Lynch.

INVENTOR.

Isaac Hyde

By Hamilton E. Towle

Att'y

N. PETERS, PHOTO-LITHOGRAPHER, WASHINGTON, D. C.

UNITED STATES PATENT OFFICE.

ISAAC HYDE, OF OAKLAND, CALIFORNIA, ASSIGNOR TO WILLIAM FRANK BROWNE, OF NEW YORK CITY.

IMPROVEMENT IN ALARM AND FARE-REGISTERING MECHANISMS.

Specification forming part of Letters Patent No. 105,459, dated July 19, 1870; reissue No. 6,916, dated February 8, 1876; application filed February 3, 1876.

*To all whom it may concern:*

Be it known that I, ISAAC HYDE, of Oakland, county of Alameda, State of California, have invented an Improved Alarm-Register for Fares, sometimes called "ticket-nippers for coupon-tickets;" and I do hereby declare the following description and accompanying drawing are sufficient to enable any person skilled in the art or science to which it most nearly appertains to make and use my said invention or improvements without further invention or experiment.

The object of my invention is to provide an improved portable instrument which may be conveniently carried in the hand of the operator or conductor, and which is constructed to keep within it a record or register of the number of fares taken, which is conveniently done by cutting or nipping off from a strip of paper a piece of such strip, which represents one fare, and which is retained in the interior of the instrument as the register or record of the number of fares collected for coupon-tickets, such as are employed on street-railways, and in which a sort of cutting jaw or knife is so attached to a receiving-box that, by pressing the handles together, a coupon can be detached and left within the box.

The nature or essence of my invention consists in providing a peculiar device for causing a signal or alarm-bell, attached to the nippers to be struck and sounded whenever a coupon is detached from a ticket, or from a paper strip, the pieces of which, when nipped, fall inside the clipping-box, and enable the inspector to learn how many fares have been received and registered, while, at the moment of actuating the instrument to perform the registration, the signal or alarm takes place by the act of the operator, so as to advertise the fact to all the passengers, and thus to have the effect of preventing any fraudulent maneuver on the part of the conductor.

In order to protect the alarm-bell from being accidentally struck while in use, and more particularly to guard and protect it from giving any fraudulent alarm (by design of the operator to make the bell ring) without registering the reception of a corresponding fare, I have devised and applied a shield or guard to the instrument, which covers the bell, and which, for economy of space and symmetry of form, I construct corresponding in shape to the bell's exterior surface; and, moreover, in order to avoid lateral enlargements of the instrument, and with further view of economy of space and symmetry of form, I attach the bell itself, and its covering, shield, or guard, to the end of the instrument, and place it at the end most distant from the end near which the operator applies his manual force to ring the alarm and operate the other parts of the instrument.

Referring to the accompanying drawing for a more complete explanation of my invention, Figure 1 is a side view, showing where the manual force of the operator is applied at the most distant part from the alarm-bell C on the levers or handles A A. Fig. 1 also shows the shield, guard, or bell cover or cap D, inclosing the bell, and secured as shown. The bell cap or shield will be seen to be symmetrically arranged in respect to the bell itself, and both it and the protected bell are arranged at the extreme end of the instrument, quite out of the way of the operator. In Fig. 1 the bell cover or guard and the bell also are broken away in one part to show their edges sectionally, and also to show the bell-hammer and other interior parts of the instrument.

Figure 2:
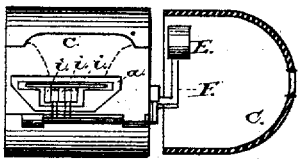

Fig. 2 is a top view, showing the knife and its appendages, with an outline of the bell in section, without the shield or guard over the bell.

Figure 3:
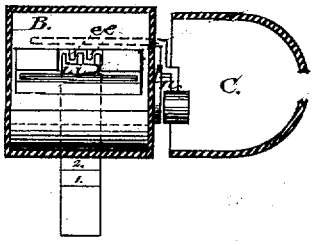

Fig. 3 is a section showing inside of receptacle and plan view of alternating fingers, hereinafter described. Fig. 3 shows also the position of the bell C and the bell-hammer E at the extremity of the arm F. This figure also shows the position of the strip of coupon-tickets or strip of paper introduced under the knife, and between the alternating fingers, ready to be clipped off.

Within the bell is a hammer, E, which is supported by an arm, F. This arm is fastened to a rocking shaft, *d*, which turns in boxes or supports fixed upon the side of the box B.

Two small fingers, *e e*, project from the side of the shaft *d* through an opening, and extend to a point near the cutting-blade *a*.

A plate, *f*, is fastened to one side of the blade, and from its lower end, near the edge of the blade, fingers *i i i* project, so as to extend between and alternate with the fingers *e*, or so that, when the handles are closed without anything being introduced, the fingers *i* will simply pass by the fingers *e*, and no stroke of the bell-hammer will be made, and the bell will, in such case, give no alarm; but when a ticket is introduced, so as to be cut, it forms a bridge, as it were, and the fingers *i* press the severed coupon against the fingers *e e*. This rocks the shaft *d*, and, through the arm F, draws the hammer E back.

The moment the coupon passes into the box the fingers *e* are released, and a spring, *n*, forces the hammer to strike the bell.

A A are the handles, or a pair of ordinary nippers, having a cutting-blade, *a*, which, on pressing the handles together, moves into a slot, *b*, in the box B, and severs a coupon from a ticket, which is introduced through a slot at *c*, so as to stand at right angles with the cutting-blade.

In the present case, Fig. 1, the bell cover or shield D is made of the same shape as the inclosed bell, and D is made with perforations to allow sound to escape.

In my apparatus I inclose the bell and its striker in a special compartment under the cover D, with a division-plate or diaphragm between the bell-chamber and the barrel or body of the machine, which is more particularly devoted to the mechanism relating to the registration and other functions of the machine.

It is especially desirable, in fare-alarms intended to be carried about the person of the operator, to have the exterior surface of the instrument as free as possible from sharp corners and angles, so that the instrument may be put into and withdrawn from the pocket with facility, or, if held in the hand or suspended by a cord or strap, that it may not be likely to strike either a painful or a defacing blow against any person or thing, which results would be likely to occur if sharp external angles were allowed in the construction of the most prominent or projecting parts of the shell or case inclosing the mechanism, &c. To avoid such objectionable features and results I construct such parts with convex or bulging exterior surfaces, and dispense with as many sharp angles as possible.

The alarm-bell, being of considerable size, would, if not covered at all, be constantly giving false alarms from accidental or intentional knocks against it, and, if it were covered by a shell or case not constructed in conformity with a due observance of the above features of my invention, would be at once awkward to use, as well as unsightly in appearance, and also dangerous and inconvenient in practical use. The form which I have devised for that part of the case or shell near the bell is of a conoidal, convex, or bulging shape, conforming to the general contour of the mass of parts immediately underneath it, and which it is designed to inclose and protect.

The alarm may be constructed and attached in various other ways; but I have found the one described to be the most efficient and convenient.

Having thus described my invention, what I claim, and desire to secure by Letters Patent, is—

1. In an alarm-instrument for facilitating the collection of fares, the combination, with the body or barrel of the instrument, of a shell, shield, guard, or protecting-cover to the alarm-bell inclosed within such cover or shell, and separated from the body or barrel by a division-plate or diaphragm, substantially as described and set forth.

2. In an alarm-instrument for the above purposes, the combination, with the body or barrel of the instrument, and separated from the same by a division-plate or diaphragm, of a bell-guard or shield, having a general exterior surface of a conoidal, convex, or bulging form, as shown, all substantially as set forth.

3. In an alarm-instrument for the above purposes, the combination, with an alarm-bell, of a suitable shield, guard, cap, or cover, corresponding in form to the exterior shape of the bell, with a division-plate between the bell and the interior of the body or barrel of the instrument, substantially as set forth.

4. In an instrument for facilitating the collection of fares, the combination, with the hollow body or barrel, of a separate other chamber, the former being used for clippings or tickets, and the latter for containing alarm mechanism, substantially as set forth.

5. In an instrument for the above-named purpose, the combination, with an alarm-bell, of a shield, guard, cap, or protecting-cover, arranged over said alarm-bell, and fixed at the outer end of the instrument, as shown, all substantially as set forth.

6. In an instrument for facilitating the collection, enumeration, or determination of the number of fares collected, the combination of a perforated guard, shield, or cover, an alarm-bell or gong, to which the perforated cover is adapted in form, and the body or barrel of the instrument, from which it is separated by a diaphragm or partition-plate, substantially as set forth.

7. In an instrument for facilitating the collection, enumeration, or determination of the number of fares collected, the combination, with the alarm mechanism and clipping device, of tripping mechanism, whereby the alarm is caused to sound only upon the introduction of a ticket or slip into position in respect to the clipping mechanism.

8. The combination of the alternating fingers *e* and *i* and the rocking shaft *d* with the arm F, substantially as and for the purpose herein described.

9. In an instrument for registering fares and tickets, the combination, with the actuating mechanism and the alarm mechanism, of means for controlling the alarm mechanism, so that an alarm can be sounded only when a fare or ticket is registered.

10. In an instrument designed to be carried in the hand, for railroad or conductor's use in collecting fares or tickets, in combination with the alarm and registering mechanism, a shield, with or without perforations, substantially as and for the purpose described.

In witness that the above-described invention is claimed by me I have hereunto set my hand and seal.

ISAAC HYDE. [L. S.]

Witnesses:
HENRY S. TIBBEY,
T. D. BRADFORD.